Patented June 15, 1948

2,443,334

UNITED STATES PATENT OFFICE 2,443,334

MANUFACTURE OF VITAMIN INTERMEDIATES

Russell W. Van House, East Detroit, Mich., assignor to Parke, Davis & Company, Detroit, Mich., a corporation of Michigan No Drawing. Application February 18, 1942, Serial No. 431,445

3 Claims. (Cl. 260—344)

The invention relates to an improved process for the manufacture of pantothenic acid, a vitamin of the B complex, and more particularly the invention relates to an improved process for the preparation of intermediate compounds which in turn may be converted into pantothenic acid.

One of the intermediate products from which pantothenic acid may be manufactured is α-hydroxy-β,β-dimethyl-γ-butyrolactone which has the following structure,

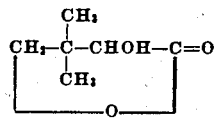

The principal object of my invention is to improve the commercial manufacture of the above mentioned substance whereby it may be readily obtained on a commercial scale more economically with the use of a minimum number of reagents and the formation of a minimum amount of unnecessary by-products. α-Hydroxy-β,β-dimethyl-γ-butyrolactone is prepared by condensing formaldehyde and isobutyraldehyde to obtain formoisobutyraldol which in turn is converted into the corresponding aldehyde cyanohydrin, and the latter hydrolyzed to the lactone.

In the past aldehyde cyanohydrins have generally been prepared either by treatment of the aldehyde with liquid hydrogen cyanide or by treatment of the aldehyde bisulfite addition compound with a water-soluble cyanide. The former process has the disadvantage of necessitating handling the very volatile and highly poisonous liquid hydrogen cyanide. In the latter process, the use of a water-soluble bisulfite has been deemed requisite, since it is generally accepted that the reaction proceeds through the intermediate bisulfite addition compound or α-hydroxy sulfonate as follows:

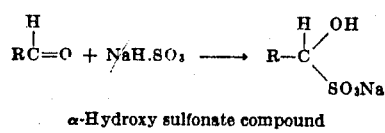

α-Hydroxy sulfonate compound

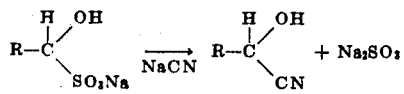

The view that the action of a water-soluble bisulfite is specific has been widely accepted and its function has been considered to involve solubilizing the aldehyde, protecting it against resinification by the action of the strongly alkaline cyanide, and catalyzing the reaction by converting the aldehyde into a form more reactive with the cyanide to form the cyanohydrin.

I have now found that the formoisobutyraldol employed in the present invention may be safely maintained in direct contact with a strongly alkaline aqueous cyanide solution without resinification and thereafter the substances reacted by the use of agents more acidic than hydrocyanic acid and which do not form an α-hydroxy sulfonate reaction product with the aldehyde.

One of the great advantages of directly using a cyanide with the formoisobutyraldol is that the latter can be produced from formaldehyde and isobutyraldehyde by the use of an alkali cyanide and the resulting formoisobutyraldol then converted into its cyanohydrin by adding acid without the necessity of first isolating the aldol.

Another advantage of my process is that by my method of forming the cyanohydrin, no additional solid inorganic salts are produced and this greatly facilitates the subsequent extraction of the lactone.

In practicing my invention I proceed as follows:

To a mixture of strong aqueous formaldehyde and isobutyraldehyde is added a water-soluble cyanide, such as potassium cyanide or sodium cyanide, care being taken to add the cyanide sufficiently slowly to maintain the reaction under control. Then a sufficient amount of a water-soluble acid stronger than hydrocyanic acid is added until the reaction mixture is approximately neutral. For this purpose, hydrochloric acid is very suitable. However, other acids such as acetic acid, sulphuric acid, phosphoric acid, or indeed, substances which are essentially acidic in character, such as sodium acid sulfate may be used. The resulting cyanohydrin usually separates as an oily layer. This layer may be withdrawn and hydrolyzed in any manner with either acids or alkalies. However, it is more convenient to leave it in the reaction mixture and to hydrolyze it by adding a sufficient amount of a strong mineral acid to make the reaction mixture strongly acidic. The hydrolysis is completed by heating the reaction mixture.

The α-hydroxy-β,β-dimethyl-γ-butyrolactone may be isolated from the reaction mixture by a variety of methods, including exhaustive extraction with a solvent such as ether and the like, but I prefer to employ a simplified isolation procedure which consists in evaporating the aqueous hydrolysate substantially to dryness, i. e., until substantially water free, extracting the residue with an inert solvent, such as acetone or dioxane, and isolating the lactone from the extract by distillation, the lactone being obtained as a fraction boiling at approximately 120–128° C. at 14 mm. pressure. The reactions of my process may be illustrated as follows.

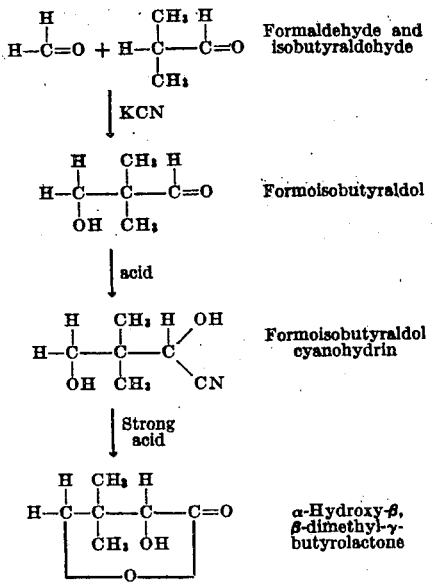

My invention may be further illustrated by the following small-plant-scale procedure.

110 lb. of isobutyraldehyde and 124 lb. of formaldehyde solution (37%) are mixed in a 100 gal. allegheny metal steam pan. With cold water in the jacket and while stirring vigorously, a solution of 106 lb. of potassium cyanide (94–96%) in about 23 gal. water is added, slowly at first, and more rapidly later, so as to keep the temperature below 30° C. Then the mixture is stirred for one hour, after which concentrated hydrochloric acid is slowly added until the reaction mixture is neutral to litmus. 151 lb. of acid are required. After standing six hours, more hydrochloric acid (conc.) is added until the mixture reacts acidic (red) to Congo red. 385 lb. of acid are required. The resulting mixture is then allowed to stand eight hours, after which it is distilled to dryness in vacuo in a glass lined still. The residue is extracted with acetone and the acetone solution is concentrated as much as possible on the steam bath. Weight at this point, 154 lb. Vacuum distillation of this residue yields 121 lb. of α-hydroxy-β,β-dimethyl-γ-butyrolactone, B. P.₁₄ 120–128° C. Yield 60.5%.

What I claim as my invention is:

1. A unit process for the preparation of α-hydroxy-β,β-dimethyl-γ-butyrolactone which comprises condensing isobutyraldehyde with formaldehyde in water solution in the presence of aqueous alkali cyanide in amount sufficient to form a mixture of formisobutyraldol and at the same time provide cyanide requisite for subsequent conversion of said formisobutyraldol to its cyanhydrin, thereafter adding an acidic substance more acid than hydrocyanic acid substantially to neutralize the reaction mixture and promote said conversion to cyanhydrin and hydrolyzing said cyanhydrin.

2. A unit process for the preparation of α-hydroxy-β,β-dimethyl-γ-butyrolactone which comprises condensing isobutyraldehyde with formaldehyde in water solution in the presence of aqueous alkali cyanide in amount sufficient to form a mixture of formisobutyraldol and at the same time provide cyanide requisite for subsequent conversion of said formisobutyraldol to its cyanhydrin, thereafter adding a strong mineral acid substantially to neutralize the reaction mixture and promote said conversion to cyanhydrin and subsequently adding more of said acid until the reaction mixture is at an acid pH thereby hydrolyzing said cyanhydrin to said lactone.

3. A unit process for the preparation of α-hydroxy-β,β-dimethyl-γ-butyrolactone which comprises condensing isobutyraldehyde with formaldehyde in water solution in the presence of aqueous alkali cyanide in amount sufficient to form a mixture of formisobutyraldol and at the same time provide cyanide requisite for subsequent conversion of said formisobutyraldol to its cyanhydrin, thereafter adding hydrochloric acid substantially to neutralize the reaction mixture and promote said conversion to cyanhydrin and subsequently adding more HCl until the mixture reacts acidic to Congo red thereby hydrolyzing said cyanhydrin to lactone.

RUSSELL W. VAN HOUSE.

REFERENCES CITED

The following references are of record in the file of this patent:

UNITED STATES PATENTS

| Number | Name | Date |
|---|---|---|
| 1,086,048 | Hibbert | Feb. 3, 1914 |
| 1,220,746 | Herrmann et al. | Mar. 27, 1917 |
| 1,437,139 | Grunstein | Nov. 28, 1922 |
| 2,271,872 | Mitchell | Feb. 3, 1942 |

OTHER REFERENCES

Journal American Chem. Society, July 1940.
Journal American Chem. Society, January 1941.
Glaser-Monatscheft, vol. 25,
Monatscheft, vol. 39,